No. 757,122. PATENTED APR. 12, 1904.
B. F. KADEL & H. F. RODEMEYER.
HAY LOADER.
APPLICATION FILED OCT. 26, 1903.
NO MODEL. 3 SHEETS—SHEET 1.
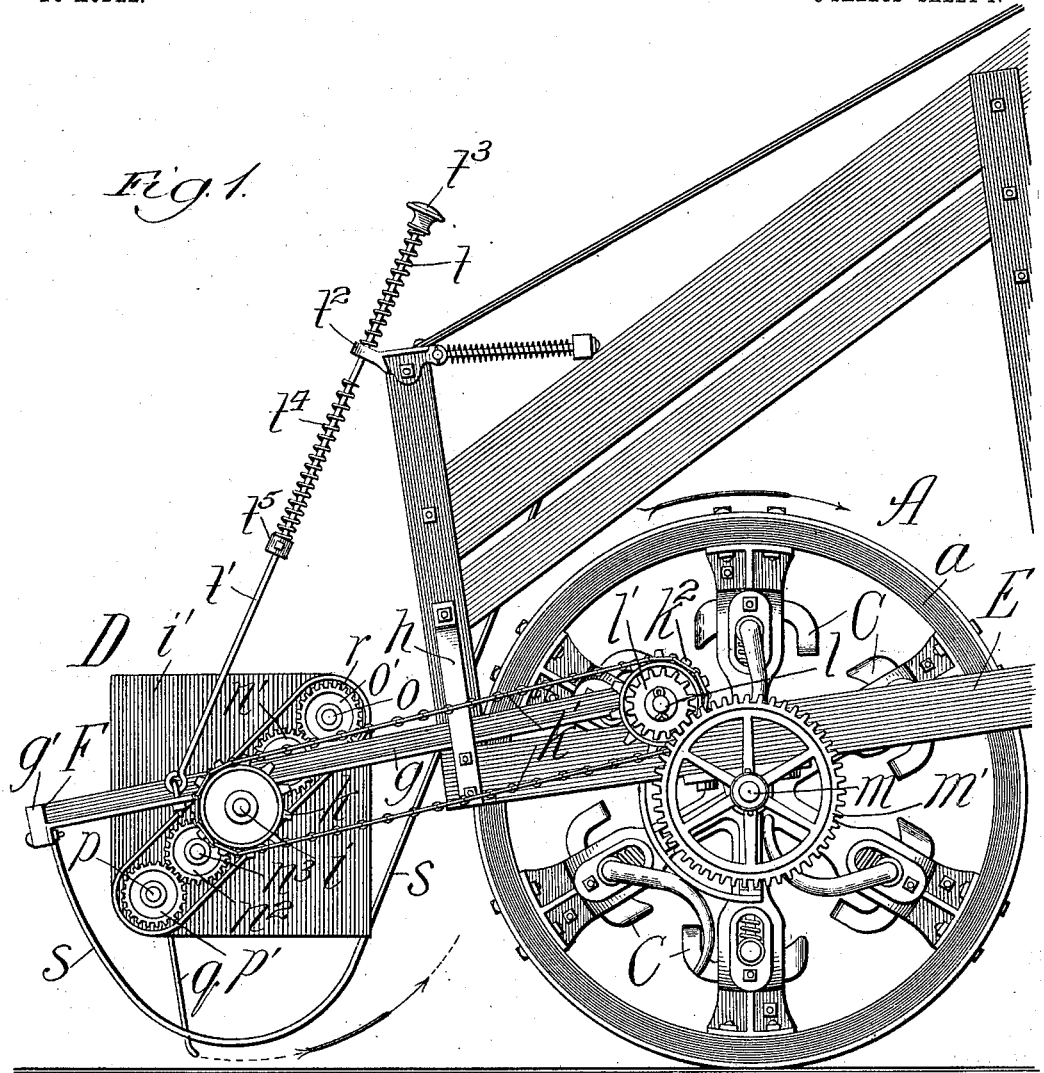
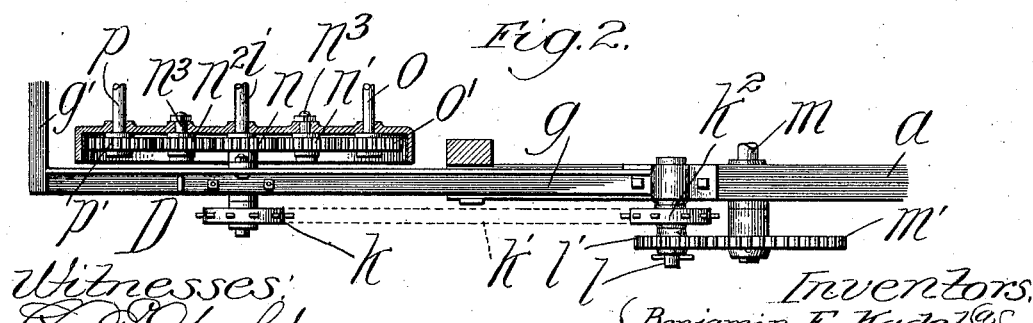

No. 757,122. PATENTED APR. 12, 1904.
B. F. KADEL & H. F. RODEMEYER.
HAY LOADER.
APPLICATION FILED OCT. 26, 1903.
NO MODEL. 3 SHEETS—SHEET 2.
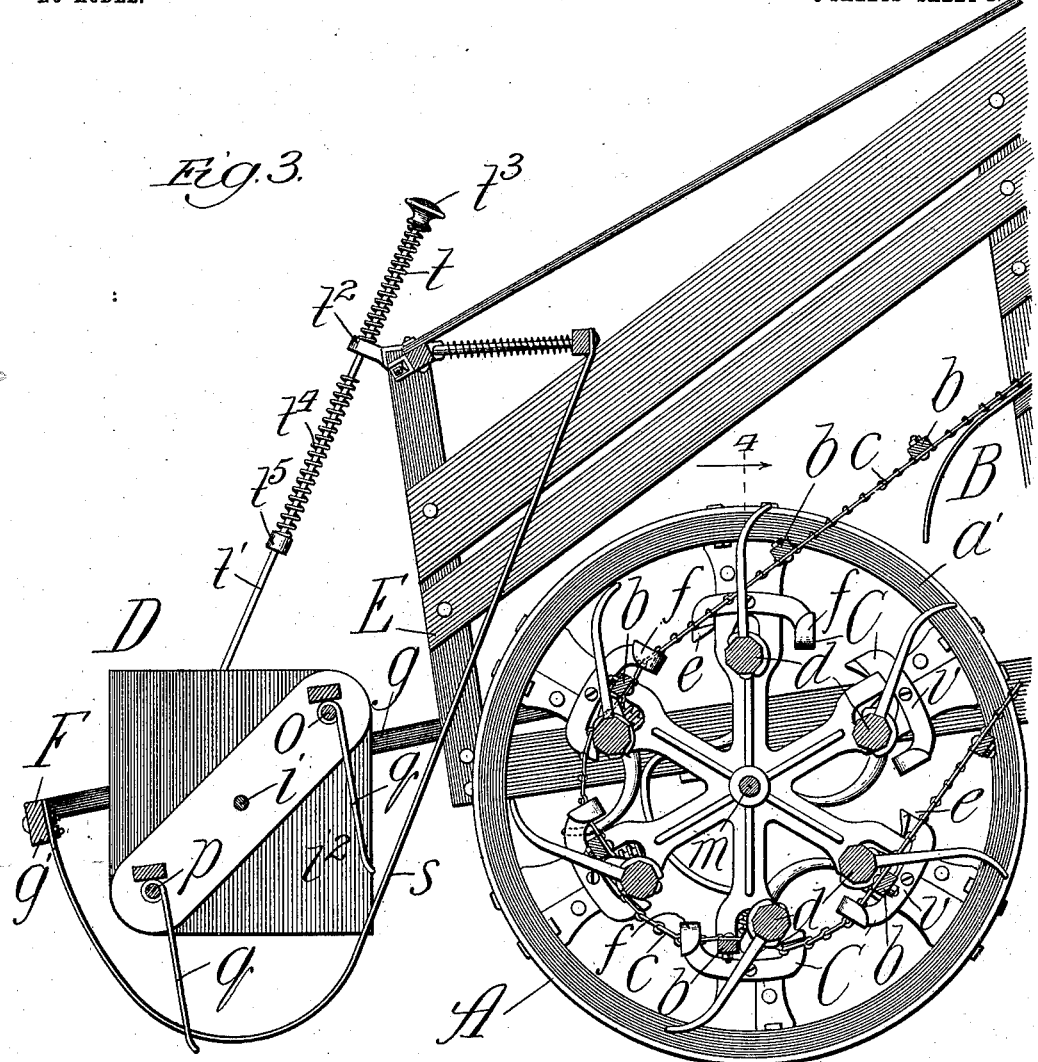
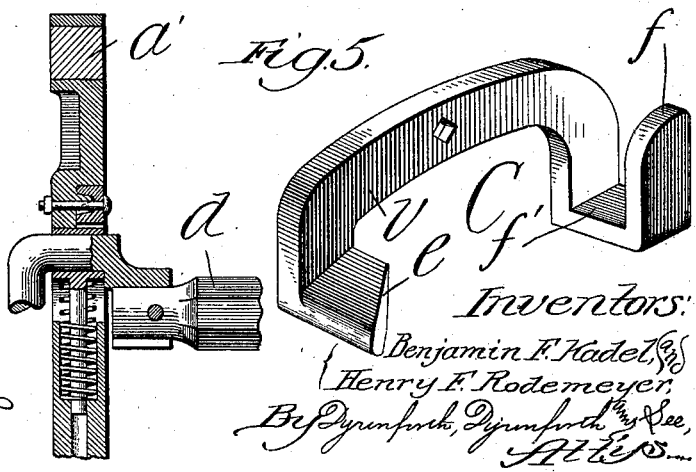
Witnesses:
Inventors:
Benjamin F. Kadel,
Henry F. Rodemeyer.

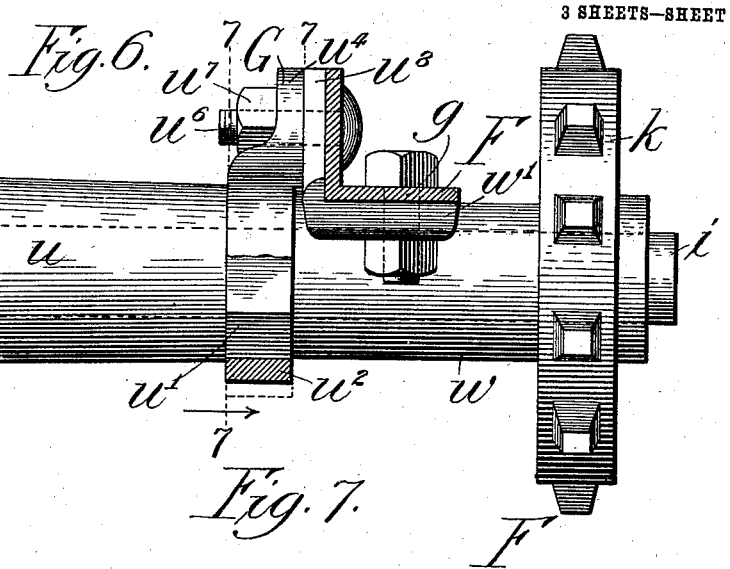
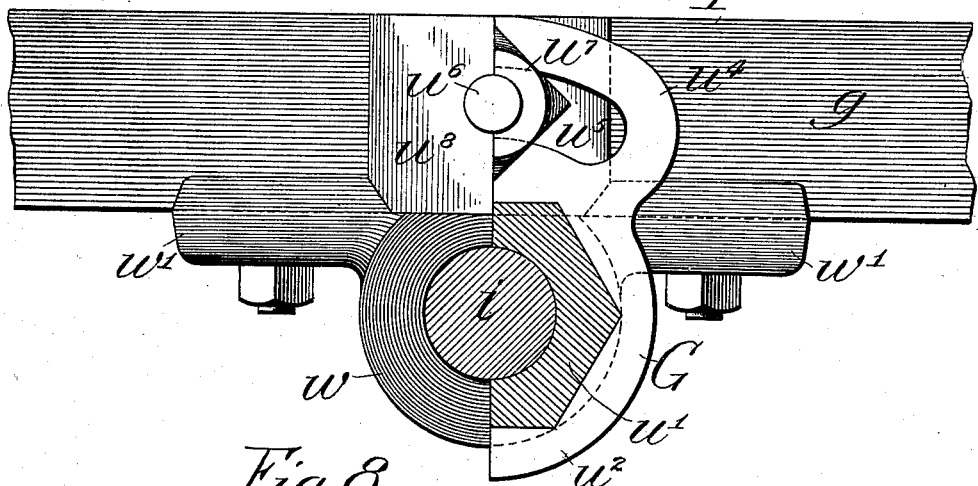
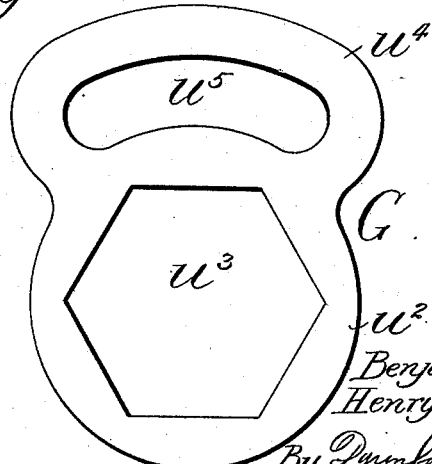

No. 757,122. Patented April 12, 1904.

UNITED STATES PATENT OFFICE.

BENJAMIN FRANKLIN KADEL, OF ROCK FALLS, AND HENRY FRANK RODEMEYER, OF STERLING, ILLINOIS, ASSIGNORS TO STERLING MANUFACTURING COMPANY, OF STERLING, ILLINOIS, A CORPORATION OF ILLINOIS.

HAY-LOADER.

SPECIFICATION forming part of Letters Patent No. 757,122, dated April 12, 1904.

Application filed October 26, 1903. Serial No. 178,546. (No model.)

*To all whom it may concern:*

Be it known that we, BENJAMIN FRANKLIN KADEL, residing at Rock Falls, and HENRY FRANK RODEMEYER, residing at Sterling, in the county of Whiteside and State of Illinois, citizens of the United States, have invented a new and useful Improvement in Hay-Loaders, of which the following is a specification.

Our invention relates to an improvment in the class of hay-loaders in which a rotatory raking-reel forming the gatherer is supported on wheels at the rear end of an endless-apron conveyer and is actuated by hitching it behind a hay-wagon to be drawn over the field to revolve and pick up from swaths or windrows the hay which is elevated by the conveyer and discharged over its upper end to deposit on the wagon to be loaded. In the use of such loaders the gatherer fails to pick up much of the shorter hay, leaving it strewn over the field to be gathered by hand, which incurs arduous labor, or to be wasted, which is undesirable.

The primary object of our invention is to enable a loader in the class referred to to clean up all or pratically all the hay in being drawn over it in the field, and this we accomplish by means of a sweeping attachment coöperating with the gatherer; and our further object is to prevent disorganization of the travel of the endless-conveyer element of the loader, which we accomplish by providing simple means to that end, all as hereinafter described, and illustrated in the accompanying drawings, in which—

Figure 1 is a broken view, in side elevation, of a hay-loader equipped with our improvement; Fig. 2, a plan section in the nature of a diagram of the machine as represented in Fig. 1; Fig. 3, a longitudinal vertical section of the machine as represented in Fig. 1; Fig. 4, a section taken at the line 4 on Fig. 3 viewed in the direction of the arrow and enlarged; Fig. 5, an enlarged perspective view of the stop-shoe detail; Fig. 6, an enlarged view, in broken sectional elevation, showing mechanism for adjusting the pitch of the sweeper-teeth; Fig. 7, a section taken at the lines 7 7 on Fig. 6 and viewed in the direction of the arrow, and Fig. 8 a view in front elevation of the adjusting-head.

Only so much of the hay-loader proper is illustrated in the drawings as is necessary to enable the construction and manner of operation of our improvements to be understood, as the hay-loader in itself need involve no features of novelty, except as to the stop-shoes on the wheels of the gatherer, and the machine selected for the application of our improvements and herein shown is that represented in United States Letters Patent No. 329,383, granted October 27, 1885, to James W. Foust for a hay-loader.

A is the gatherer, comprising the usual wheels $a$ and $a'$, journaled on the frame of the machine at the base of the endless conveyer B and carrying on their spokes the axially-movable rakes $d$, the conveyer being in the form of a skeleton apron composed of transverse slats $b$, tied together in their relatively spaced condition by cords (not shown) and connected in series by endless chains $c$ near their opposite ends. On the inner sides of the wheels we secure in the paths of the chains stop-shoes C, preferably providing one such shoe on each spoke of a wheel rigidly fastened thereto. The shoe is an arch-shaped casting forming the body $v$, provided at one end, extending at a right angle therefrom, with a guide-lip $e$, having an oblique upper face, and at its other end with an offset upright finger $f$, having its rear edge curved, as shown, or beveled toward its outer extremity. As the wheels revolve in the movement of the loader over a field to actuate the rakes to gather the hay and the endless apron to convey it to its dumping end the chains and slat ends ride over the guide-lips $e$ in their path, and the chains also pass through the offset spaces $f'$ at the outer sides of the fingers $f$, which present stops to undue advancement of the slats, as under any excessive sagging pressure on the traveling apron such as would be exerted, say, by a man bearing his weight upon them in climbing on the machine. Such advancement would be prevented by the engagement of the slat ends with the fingers $f$, which they clear by riding over them in the travel of the chains, and any undue strain on the platform that would tend to back up or impede the travel of the chains is prevented by the teeth of the rakes $d$, immediately behind the slats. The shoes C therefore insure the progressive timely action of the parts, which is liable to be disorganized from such cause as that suggested unless the shoes or some equivalent means be provided to prevent that result.

D is the sweeper. As shown in its preferred construction, it involves the following-described reel construction.

In a supplemental frame F, extending rearward from and hinged upon the main frame E of the machine and comprising side bars $g$ $g$, connected at their outer ends by a crossbar $g'$ and passing through loops $h$ on the sides of the main frame to permit the supplemental frame to yield upwardly, is journaled a shaft $i$, carrying heads $i'$ $i^2$ near its ends, preferably of the substantially rectangular shape illustrated, with two opposite corners rounded, as shown. This shape of the reel-heads adapts them the better to shed the hay and prevent it from becoming entangled about them, though our invention is not intended to be limited to any particular shape of these heads. On one end of the shaft $i$ is secured a sprocket $k$, connected by a chain $k'$ with a sprocket $k^2$ on the stub-shaft $l$ on the frame E and carrying a pinion $l'$ in mesh with a cog-wheel $m'$ upon the axle $m$ of the gatherer A. The sweeper-shaft $i$ passes loosely through a pinion $n$, fixed on the frame F, preferably as hereinafter described, between two idle pinions $n'$ $n^2$, journaled on stub-shafts $n^3$, provided on the head $i'$, these idle pinions meshing, respectively, with pinions $o'$ and $v'$ on corresponding ends of shafts $o$ and $p$, journaled in the heads $i'$ $i^2$ and forming the heads of rakes having teeth $q$ extending from them. The rakes are thus connected by a train of gears, shown shielded by an oblong housing $r$ on and extending diagonally of the head $i'$ to cause the rotation of the reel also to rotate the rakes on their own axes with the rake-teeth always in the same relative positions. Fenders $s$ are shown to extend for their usual stripping purpose about the base of the sweeper between the frame-bar $g'$ and the frame E. The frame F is yieldingly supported in its operating position by springs $t$ $t$ on suspension-rods $t'$ $t'$, extending from the frame sides through guide-eyes $t^2$ on the main frame E, between which and end stops $t^3$ on the rods the springs are confined, and buffer-springs $t^4$ are also sustained against stops $t^5$ on the rods to yieldingly hold the sweeper to its work in passing over obstructions.

Our invention relative to the sweeper as an attachment on a hay-loader of the class referred to consists, broadly, in combining a rotary raking-sweeper with the loader to cooperate with the gatherer thereof. Hence we do not limit our invention to the particular construction of the sweeper herein shown and described.

The operation will be understood to be as follows: With the loader hitched as usual to a hay-wagon to be loaded and having the sweeper attached to it the travel of the wagon along or across the swaths or windrows of hay to be gathered draws the loader after it upon its wheels $a$ $a'$, causing them to revolve and actuate the gatherer-rakes and the conveyer, all in the usual manner. The rotation of the wheels by their described gear connection with the sweeper actuates the rakes of the latter to pick up such hay as may have escaped the gatherer and throw it to the latter to be taken up by it.

It is desirable to provide means for readily adjusting the pitch of the sweeper-teeth $q$, and we have provided for that purpose the mechanism illustrated in detail in Figs. 6, 7, and 8, of which the following is a description: The pinion $n$ is on one end of a sleeve $u$, the opposite end of which is provided with a circumferential angular bearing $u'$, shown of hexagonal form. G is the adjusting-head, which may be a casting, formed with a body $u^2$, containing an opening $u^3$ to fit about the bearing $u'$ and surmounted by a hanger $u^4$, containing an arc-shaped slot $u^5$. The head G is fastened to the upright portion of a frame-bar $g$ by a bolt $u^6$, passing through the slot $u^5$ and secured by a nut $u^7$, with a washer $u^8$ interposed. The sprocket $k$ is secured to the shaft $i$ to abut against a sleeve-section $w$, through which and the sleeve $u$ the shaft $i$ passes loosely, and which is provided with flanges $w'$, through which it is bolted to the frame-bar $g$.

To adjust the pitch of the teeth $q$, the bolt $u$ is loosened, permitting the head G to be turned by hand, and with it the sleeve $u$ and pinion $n$, to actuate the pinions $o'$ and $p'$ to turn the shafts carrying them, and thus set the teeth to any pitch desired, at which they are held by refastening the bolt $u^6$.

What we claim as new, and desire to secure by Letters Patent, is—

1. The combination with a wheeled hay-loader having a frame and a gatherer, an auxiliary rotary rake supported on said frame at the rear of the gatherer and geared with a revolving part of the loader, the rake members of said auxiliary rake having ground contact during a part of their movement.

2. In combination with a wheeled hay-loader having a frame and a gatherer, an auxiliary rotary rake yieldingly supported on said frame at the rear of the gatherer and geared with a revolving part of the loader, said auxiliary rake provided with rotary rake members geared together and having ground contact during a part of their movement.

3. In combination with a hay-loader of the character described, having a loader-frame and a gatherer, a rotary raking-sweeper comprising a reel supported on the loader-frame to extend behind the gatherer, said reel having heads with rakes journaled in them and geared together and with the gatherer to coöperate therewith.

4. In combination with a hay-loader of the character described, having a loader-frame and a gatherer, a rotary raking-sweeper comprising a reel supported on the loader-frame to extend behind the gatherer, said reel having heads with rakes journaled in them and geared together and with the gatherer to coöperate therewith, and an adjusting device connected with the rake-gearing for adjusting the pitch of the rake-teeth.

5. In combination with a hay-loader of the character described, having a loader-frame and a gatherer, a rotary raking-sweeper comprising a reel supported on the loader-frame to extend behind the gatherer, said reel having angular heads with rakes journaled in them and geared together and with the gatherer to coöperate therewith.

6. In combination with a hay-loader of the character described, having a loader-frame and a gatherer, a rotary raking-sweeper comprising a reel supported on the loader-frame to extend behind the gatherer, said reel having angular heads formed with rounded corners, and rakes journaled in said heads and geared together and with the gatherer to coöperate therewith.

7. In combination, a hay-loader of the character described having a loader-frame and a gatherer and a gatherer-axle, a gear-wheel on the gatherer-axle and a sprocket with a pinion for said gear-wheel journaled on the loader-frame, a supplemental frame extending rearward from said loader-frame, and a sweeper comprising heads on a shaft journaled in said supplemental frame, a pinion fixed on said supplemental frame and through which said shaft passes loosely, said fixed pinion carrying a sprocket having a chain connection with said first-named sprocket, and rakes journaled in said heads and carrying pinions, with idle pinions gearing them with said fixed pinion.

8. In combination, a hay-loader of the character described having a loader-frame and a gatherer and a gatherer-axle, a gear-wheel on the gatherer-axle and a sprocket with a pinion for said gear-wheel journaled on the loader-frame, a supplemental frame hinged to said loader-frame and extending rearward thereof and yieldingly suspended toward its free end from said loader-frame by spring-rods, and a sweeper comprising heads on a shaft journaled in said supplemental frame, a pinion fixed on said supplemental frame and through which said shaft passes loosely, said shaft carrying a sprocket having chain connection with said first-named sprocket, rakes journaled in said heads and carrying pinions, and idle pinions between the rake-pinions and fixed pinions.

9. In combination, a hay-loader of the character described having a loader-frame and a gatherer and gatherer-axle, a gear-wheel on the gatherer-axle and a sprocket with a pinion for said gear-wheel journaled on the loader-frame, a supplemental frame hinged to said loader-frame, a sweeper comprising heads on a shaft journaled in said supplemental frame and carrying a sprocket having a chain connection with said first-named sprocket, and rakes journaled in said heads and carrying pinions, an adjusting-head suspended from said supplemental frame, and a pinion fixedly connected with said supplemental frame, geared by idle pinions with the pinions on the rakes and loosely surrounding the sweeper-shaft.

10. In combination, a hay-loader of the character described having a loader-frame and a gatherer and gatherer-axle, a gear-wheel on the gatherer-axle and a sprocket with a pinion for said gear-wheel journaled on the loader-frame, a supplemental frame hinged to said loader-frame, a sweeper comprising heads on a shaft journaled in said supplemental frame and carrying a sprocket having a chain connection with said first-named sprocket, rakes journaled in said heads and carrying pinions, an adjusting-head having a hanger provided with an arc-shaped slot at which it is adjustably bolted to a bar of said supplemental frame, a sleeve fixedly supported by said supplemental frame and carrying a pinion, and idle pinions gearing said rake-pinions with the stationary pinion on said sleeve, through which the sweeper-shaft extends.

11. In a hay-loader of the character described, the combination with the gatherer-wheels of a conveyer comprising endless chains and slats tied together to form the apron and stop-shoes in the paths of the endless chains and slats of the conveyer-apron, each shoe comprising a body having a chain-guide at one end and a slat-stop at the opposite end.

12. In a hay-loader of the character described, the combination with the gatherer-wheels of a conveyer comprising endless chains and slats tied together to form the apron, and stop-shoes secured at intervals on the inner sides of said wheels in the paths of the endless chains and slats of the conveyer-apron, each shoe comprising a body having a chain-guiding lip at one end and at its other end a chain-receiving offset and a stop-finger.

BENJAMIN FRANKLIN KADEL.
HENRY FRANK RODEMEYER.

In presence of—
JOHN D. TRACY,
R. L. LEITCH.